United States Patent [19]

Joly

[11] Patent Number: 5,526,384
[45] Date of Patent: Jun. 11, 1996

[54] FUELING MACHINE FOR FUEL ASSEMBLIES FOR THE CORE OF A NUCLEAR REACTOR, HAVING REMOVABLE GUIDE BEAMS

[75] Inventor: Philippe Joly, Mareil Marly, France

[73] Assignee: Framatome, Courbevoie, France

[21] Appl. No.: 432,840

[22] Filed: May 2, 1995

[30] Foreign Application Priority Data

May 5, 1994 [FR] France ................................. 94 05547

[51] Int. Cl.$^6$ ........................... G21C 19/10; G21C 19/16
[52] U.S. Cl. ............................................................ 376/271
[58] Field of Search ................................... 376/271, 268, 376/264

[56] References Cited

U.S. PATENT DOCUMENTS

| | | | |
|---|---|---|---|
| 4,311,557 | 1/1982 | Kowalski et al. | 376/271 |
| 4,511,531 | 4/1985 | Swidwa et al. | 376/271 |
| 4,781,882 | 11/1988 | Salton et al. | 376/271 |

FOREIGN PATENT DOCUMENTS

| | | |
|---|---|---|
| 091580 | 10/1983 | European Pat. Off. . |
| 291286 | 11/1988 | European Pat. Off. . |
| 3109249 | 10/1982 | Germany . |
| 2060238 | 4/1981 | United Kingdom . |

*Primary Examiner*—Daniel D. Wasil
*Attorney, Agent, or Firm*—Pollock, Vande Sande & Priddy

[57] ABSTRACT

The guide elements (18) for the internal mast (13) include at least two straight beams (28), on each of which at least two sets of rotatable rollers (19) are mounted which are spaced apart from one another in the axial direction (11) and are on the exterior surface of the external shaft (10) of the fuelling machine. The external shaft (10) includes a through opening (27) for passage of each of the sets of rollers (19) of each of the beams (28), inside the external shaft (10) in order to guide the internal mast (13).

8 Claims, 4 Drawing Sheets

FUELING MACHINE FOR FUEL ASSEMBLIES FOR THE CORE OF A NUCLEAR REACTOR, HAVING REMOVABLE GUIDE BEAMS

FIELD OF THE INVENTION

The invention relates to a fuelling machine for fuel assemblies for the core of a nuclear reactor.

BACKGROUND OF THE INVENTION

Nuclear reactors such as pressurized water nuclear reactors include a vessel which contains the core of the nuclear reactor which consists of fuel assemblies and through which, in service, the cooling fluid of the reactor flows.

The core of the reactor consists of fuel assemblies which are generally of a right prismatic shape, which rest on a core support plate via their lower part or bottom nozzle and which are placed in a vertical arrangement. The fuel assemblies are juxtaposed and constitute a dense arrangement in which each of the fuel assemblies is in contact with adjacent assemblies, in a lattice arrangement, via its nozzles and its spacer grids.

The fissile fuel material contained in the fuel assemblies is progressively consumed in the nuclear reactor in service, so that the fuel assemblies are progressively depleted in fissile fuel material and consequently undergo a form of wear.

It is therefore necessary periodically to carry out refuelling operations of the core of the nuclear reactor. These operations, which require shutdown and cooling of the nuclear reactor, are generally carried out on a fraction of the core of the reactor, so as to optimize the use of fuel.

Furthermore, when first commissioning a nuclear reactor, it is necessary to fuel the core with new fuel assemblies which constitute the first charge of the nuclear reactor.

The operations of fuelling or refuelling a nuclear reactor are carried out under water, with the vessel head being dismounted, from the upper level of the cavity of the reactor, in the bottom of which the reactor pit opens out.

In order to carry out fuelling and refuelling operations, use is made of a fuel assembly lifting and handling machine, called a fuelling machine, which includes horizontal guide means arranged above the upper level of the cavity and a carriage mounted movably on the guide means, in at least two directions of a horizontal plane, so as to be capable of placing fuel assembly gripping and lifting means in line with each of the fuel assembly positions in the core of the nuclear reactor.

The fuel assembly gripping and lifting means include a tubular external shaft of generally cylindrical shape, fastened on the carriage with its axis vertical, and a cylindrical internal mast in a coaxial arrangement and mounted movably in the axial direction, inside the external shaft.

In order to fit the fuel assemblies in the core of the reactor where these assemblies are placed contiguously in a lattice, it is necessary to provide extremely precise handling and lifting means.

In particular, the internal mast of the fuelling machine must make it possible to displace the fuel assemblies along a perfectly defined vertical axial direction. For this purpose, the mobile internal mast of the fuelling machine generally includes longitudinal slideways which interact, during displacement of the internal mast, with sets of rollers having axes perpendicular to the axial direction of the external shaft and of the internal mast and which are arranged in a plurality of groups aligned in directions parallel to the axis of the external shaft and of the mobile internal mast.

The displacements in the axial direction, i.e. in the vertical direction, of the mobile mast for carrying out the core refuelling operations are of very high amplitude and must be carried out with very high precision with respect to the alignment of the direction of displacement of the mobile mast with the axes of the assembly positions in the core of the reactor being fuelled.

The guide groups for the mobile mast which are carried by the external shaft are very long and must therefore have perfectly straight alignment axes which are perfectly defined in orientation and in position.

Before start-up of the fuelling machine, or even during use, it may be necessary to check and adjust the alignment of the mobile mast guide means carried by the external shaft.

These adjustments may be required, in particular, by loss of adjustment of the roller groups of the guide devices or by deformation of the external shaft, for example due to an impact.

This operation, which is carried out in the reactor building, in proximity to the reactor pit, requires scaffolding to be installed in order to be able to access the various roller positions along the external shaft.

Adjustment is carried out by means of eccentrics which are arranged at the level of each roller support which is accessible through an opening provided in the external shaft, at the level of the roller support.

Such an operation, which includes mounting and dismounting scaffolding, may require a length of the order of 48 hours, during which the fuelling machine is unavailable, which commensurately lengthens the total time of the shutdown of the reactor for refuelling.

In addition, the operations of adjusting the guide elements of the mobile mast of the fuelling machine inside the cavity of the reactor require this part of the cavity to be emptied, after fitting a gate.

SUMMARY OF THE INVENTION

The object of the invention is therefore to provide a fuelling machine for fuel assemblies for the core of a nuclear reactor, inside a reactor vessel which is open at its upper end, including horizontal guide means arranged above the vessel of the reactor, a carriage mounted movably on the guide means, a tubular external shaft fastened on the carriage with its axis vertical, a cylindrical internal mast mounted in a coaxial arrangement and so that it can move in the axial direction inside the external shaft, by virtue of guide elements, and including means of attachment of a fuel assembly in the vertical position and means of displacing the internal mast in the axial direction of the external shaft, which means are carried by the carriage, this fuelling machine making it possible to adjust alignment and straightness of the guide elements of the mobile mast, in a simple manner and outside the cavity of the nuclear reactor, without lengthening the shutdown time of the reactor for fuelling or refuelling.

For this purpose, the guide elements for the internal mast include at least two straight beams provided with means for fastening in an axial direction on the exterior surface of the external shaft, on each of which beams at least two sets of rollers which can rotate about an axis perpendicular to the axial direction of the external shaft and of the internal mast are mounted, spaced apart in the axial direction, the external shaft including a through opening for passage of each of the sets of rollers of each of the beams, inside the external shaft in order to guide the internal mast.

BRIEF DESCRIPTION OF THE DRAWINGS

In order better to explain the invention, a description will now be given, with reference to the attached drawings, of an embodiment of a fuelling machine according to the invention.

DETAILED DESCRIPTION

Figure 1A:
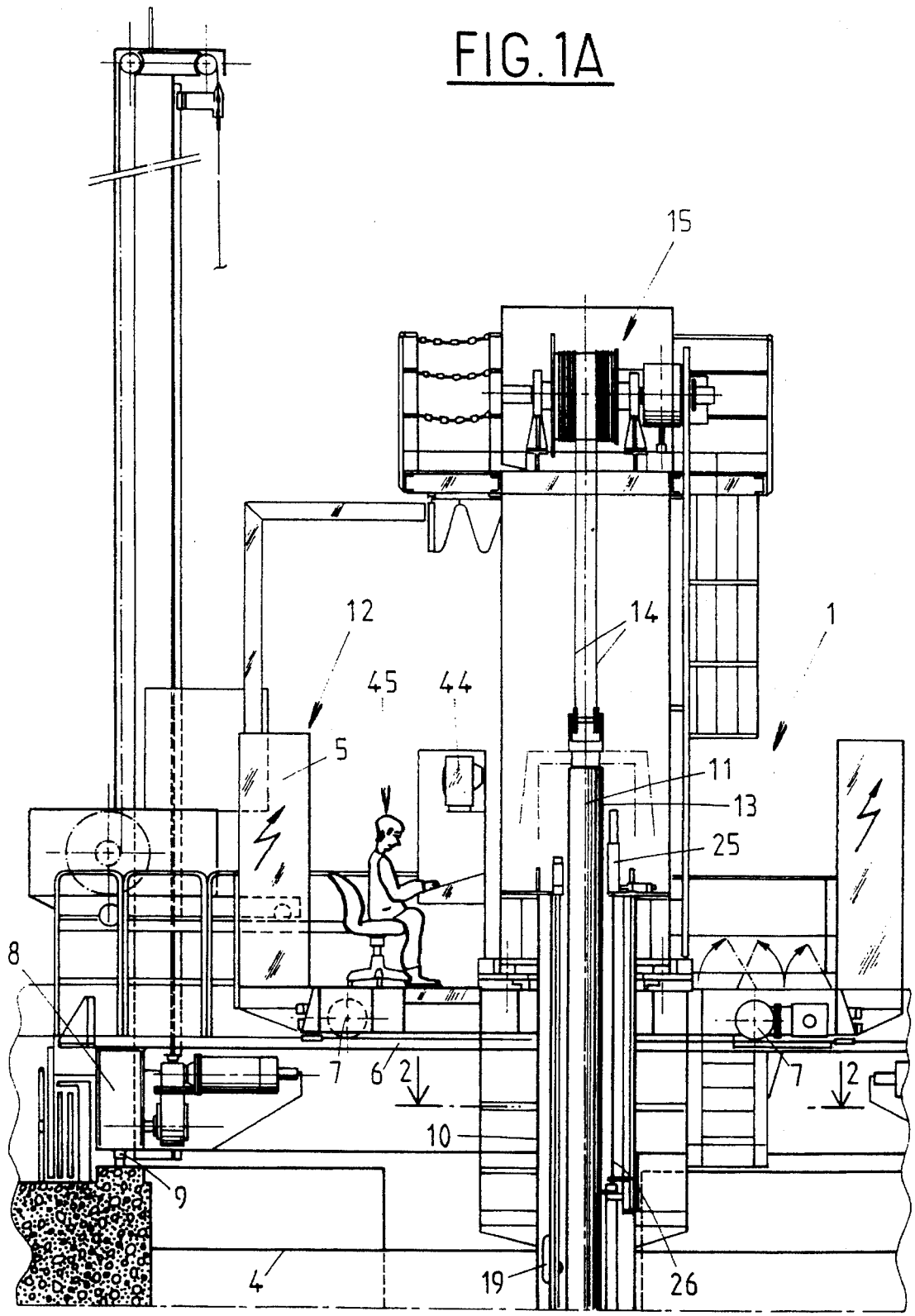
FIGS. 1A and 1B are schematic views in section through a vertical plane of the top part and of the bottom part, respectively, of a fuelling machine according to the invention.
Figure 1B:
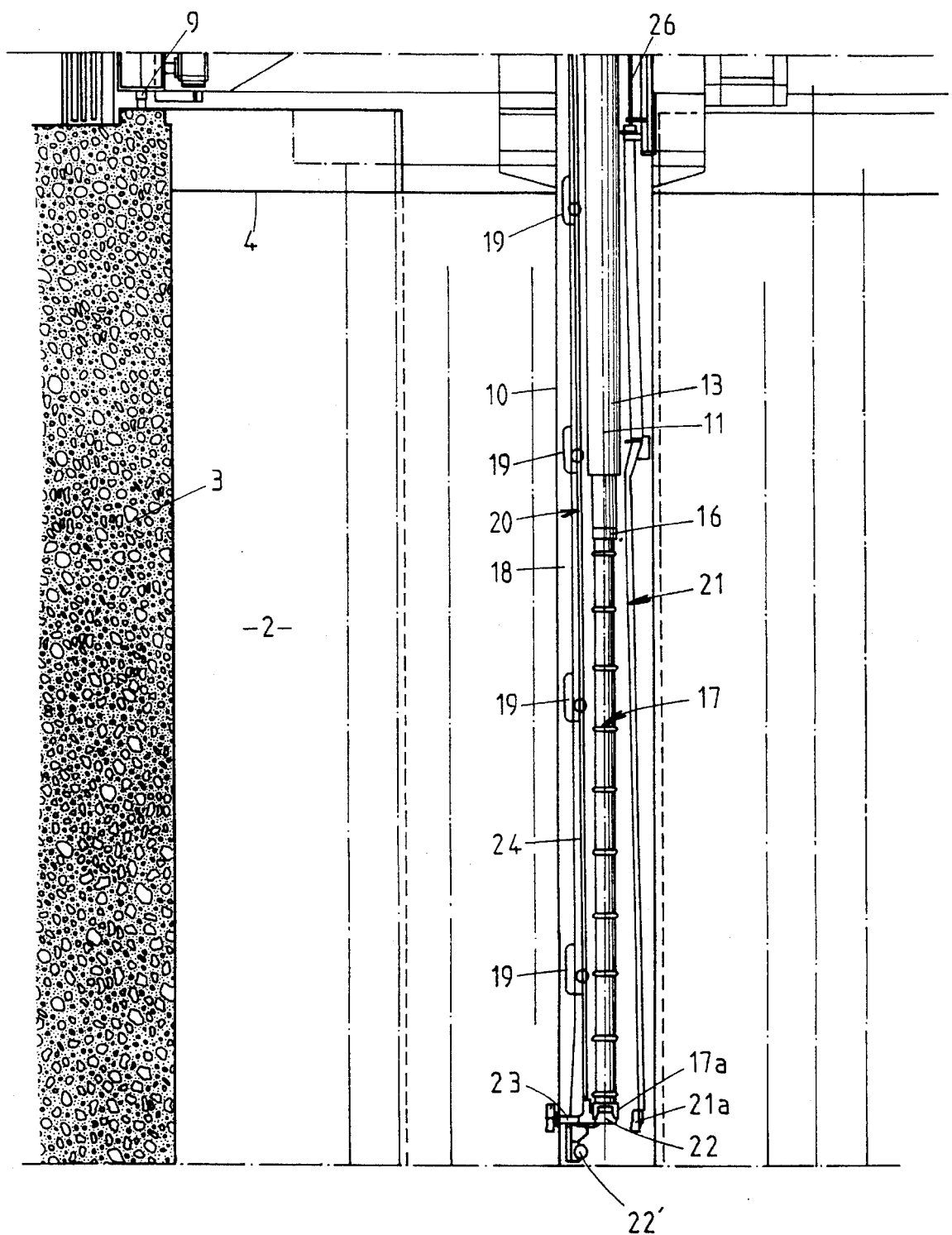

FIGS. 1A and 1B show a fuelling machine 1, resting on the upper edge of the vertical concrete walls 3 of the cavity 2 of a nuclear reactor, in the bottom of which a reactor pit containing the vessel of the reactor opens out. The fuelling machine 1 is used for lifting or fitting fuel assemblies constituting the core of the reactor arranged inside the vessel.

The operations of fuelling or refuelling the nuclear reactor, which require use of the fuelling machine 1, are carried out underwater, the cavity being filled with water up to the level 4.

The fuelling machine 1 includes a mobile carriage 12, making it possible to displace the fuelling machine in order to take up or deposit a fuel assembly in any location in the core of the reactor inside the vessel.

The carriage 12 includes a first carriage 5 mounted movably on rails 6, by means of wheels 7. The rails 6 are themselves fastened on a second carriage 8 mounted movably on rails 9 resting on the upper part of the walls 3 of the cavity 2 and arranged in a direction perpendicular to the direction of the rails 6. The carriage 12 including the first and second carriages constitutes a carriage having crossed movements in two perpendicular directions of the horizontal plane.

The first carriage 5 of the assembly 12 constituting the carriage of the fuelling machine carries the external tubular shaft 10 of the fuelling machine, which is of cylindrical shape and has a vertical axis 11. The shaft 10 rests on the carriage 5 via guide means allowing it to be displaced in rotation and to be oriented about the axis 11 on the first carriage 5.

An internal mast 13 is mounted, inside the external shaft 10, in a coaxial arrangement and so as to be movable along the direction of the axis 11 of the external shaft, which mast is fixed by means of pulleys to lifting cables 14 of a winch 15. The lower part of mast 13 includes means 16 which make it possible to attach a fuel assembly 17 by means of its top nozzle.

The mobile carriage 12 of the fuelling machine makes it possible to displace the assembly consisting of the external shaft 10 and the internal mast 13 in two directions of the horizontal plane in crossed movements. In this way, it is possible to place the mobile mast 13 in line with any position inside the core of the nuclear reactor, in order to take up or deposit any fuel assembly 17.

The external shaft 10 includes means, such as 18, for guiding in the axial direction 11 the internal mast 13 which is movable inside the external shaft 10.

A guide means 18, which has only been represented schematically in FIG. 1, includes sets of guide rollers 19 spaced along the axial direction of the external shaft 10 and arranged so as to interact with guide parts of the mast 13, as will be explained hereinbelow.

The mast 13 can be displaced in the axial direction 11, which corresponds to the vertical direction, during use of the fuelling machine, by virtue of the winch 15, between a completely raised position represented in FIG. 1 and a bottom position in which the attachment device 16 of the mobile mast 13 is at the level of the top nozzles of the fuel assemblies of the core of the nuclear reactor. In this bottom position, it is possible to grip or deposit a fuel assembly 17 of the core of the reactor. In the top position of the mobile mast 13, as represented in FIGS. 1A and 1B, the fuel assembly 17 fastened to the lower end of the mobile mast 13 by means of the attachment device 16 is completely housed within the external shaft 10 which protects the fuel assembly, for example during displacements of the carriage 12 in the horizontal directions.

Between its bottom position and its top position, the mobile mast 13 is guided inside the external shaft 10 by the guide elements 18.

The alignment of the sets of rollers 19 of the guide elements 18 determines the alignment and the direction of displacement of the mobile mast 13 and of the fuel assembly 17.

The alignment of the rollers 19 should therefore be checked and adjusted very precisely.

The fuelling machine also includes, inside the external shaft 10, a means 20 for holding the fuel assembly 17 in the transport position and a means 21 making it possible to facilitate engagement of the fuel assembly in order to fit it in the core.

The holding device 20 includes an end-stop 22 mounted so as to pivot about a pin 23 at the lower end part of the external shaft 10 and a substantially axial manuevering rod 24 connected at one of its ends to the holding end-stop 22 and, at its other end which is next to the upper part of the external shaft 20, to a manuevering jack.

The manuevering jack makes it possible to displace the end-stop 22 between a position for holding the fuel assembly 17, represented in solid lines in FIG. 1, in which the end-stop is engaged in the bottom nozzle 17a of the fuel assembly, and a standby position 22' represented in dashes.

The engagement device 21 includes a very long body which has a bent part connected at its upper part to a manuevering rod 26 which is connected to a manuevering jack 25 at the level of the upper part of the external shaft 10. The jack 25 makes it possible to displace the elongate body of the engagement device 21, by means of the manuevering rod 26, between a standby position represented in FIG. 1 and a working position in which the body 21 of the engagement device rests on attachment means which are solidly attached to the exterior surface of the mobile internal mast 13. In this working position, the lower part of the engagement device 21, below the bent part, is arranged adjacent to the lateral surface of the fuel assembly 17. In this position, a lower end-stop 21a makes it possible to guide the bottom nozzle 17a of the fuel assembly 17 at the moment when the fuel assembly 17 is deposited by the mobile mast 13.

When the mobile mast 13 to which a fuel assembly 17 is fastened is lowered into the cavity of the reactor and then into the vessel, so that the leg of the fuel assembly comes into proximity with the lower support plate of the core, the end-stop 21a is recentered on the lower core plate and guides the bottom nozzle 17a of the fuel assembly with respect to the lower core plate during its descent. The fuel assembly is thus fitted very reliably. Fitting of the fuel assembly on the support plate of the core in a desired orientation is guaranteed by virtue of the possibility of orienting the external shaft 10, in which the mobile internal mast 13 is mounted, on the carriage 5, about the axis 11.

Figure 2:
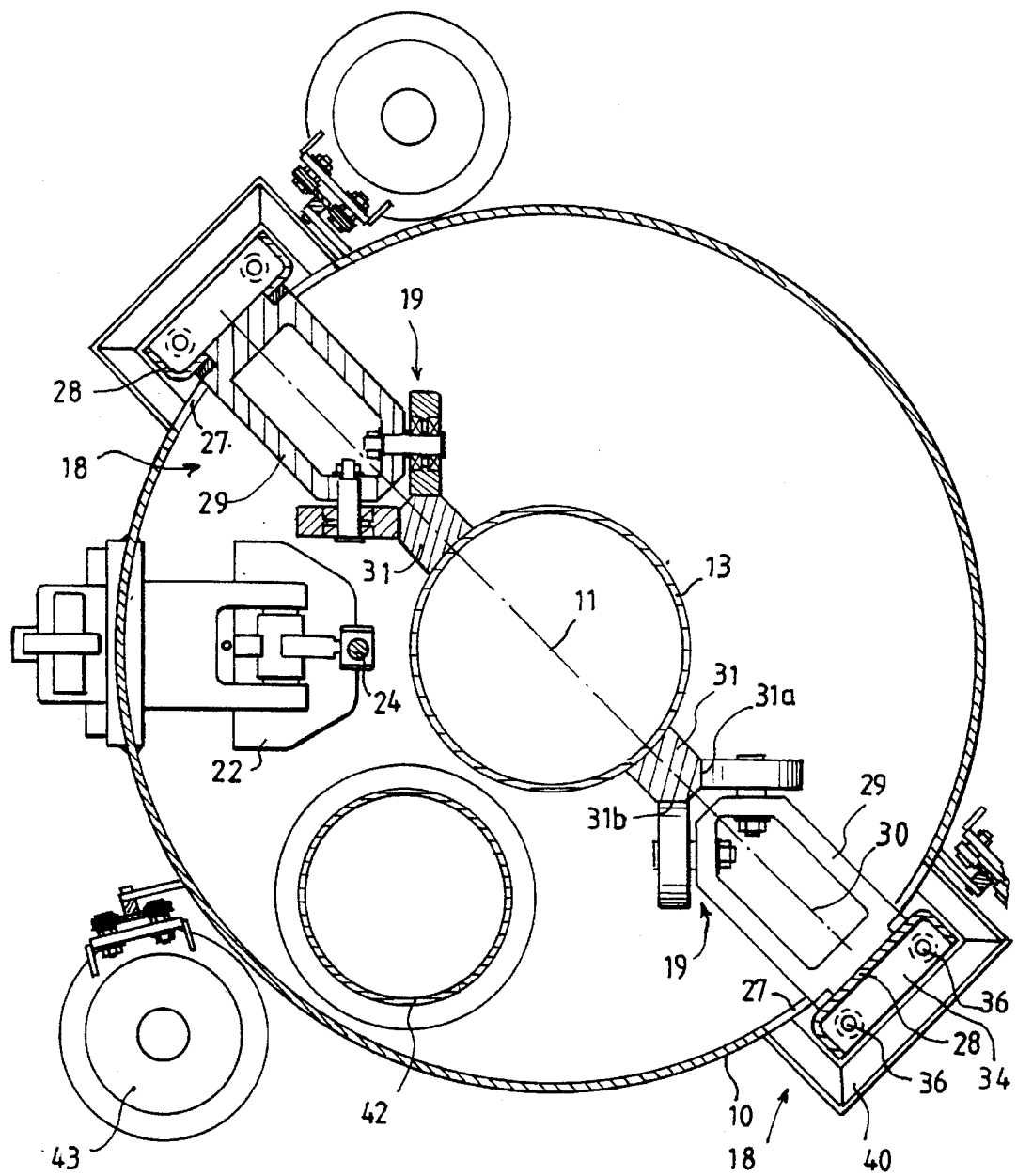
FIG. 2 is a view in cross-section on a larger scale of the external shaft and of the internal mast of the fuelling machine.
Figure 3:
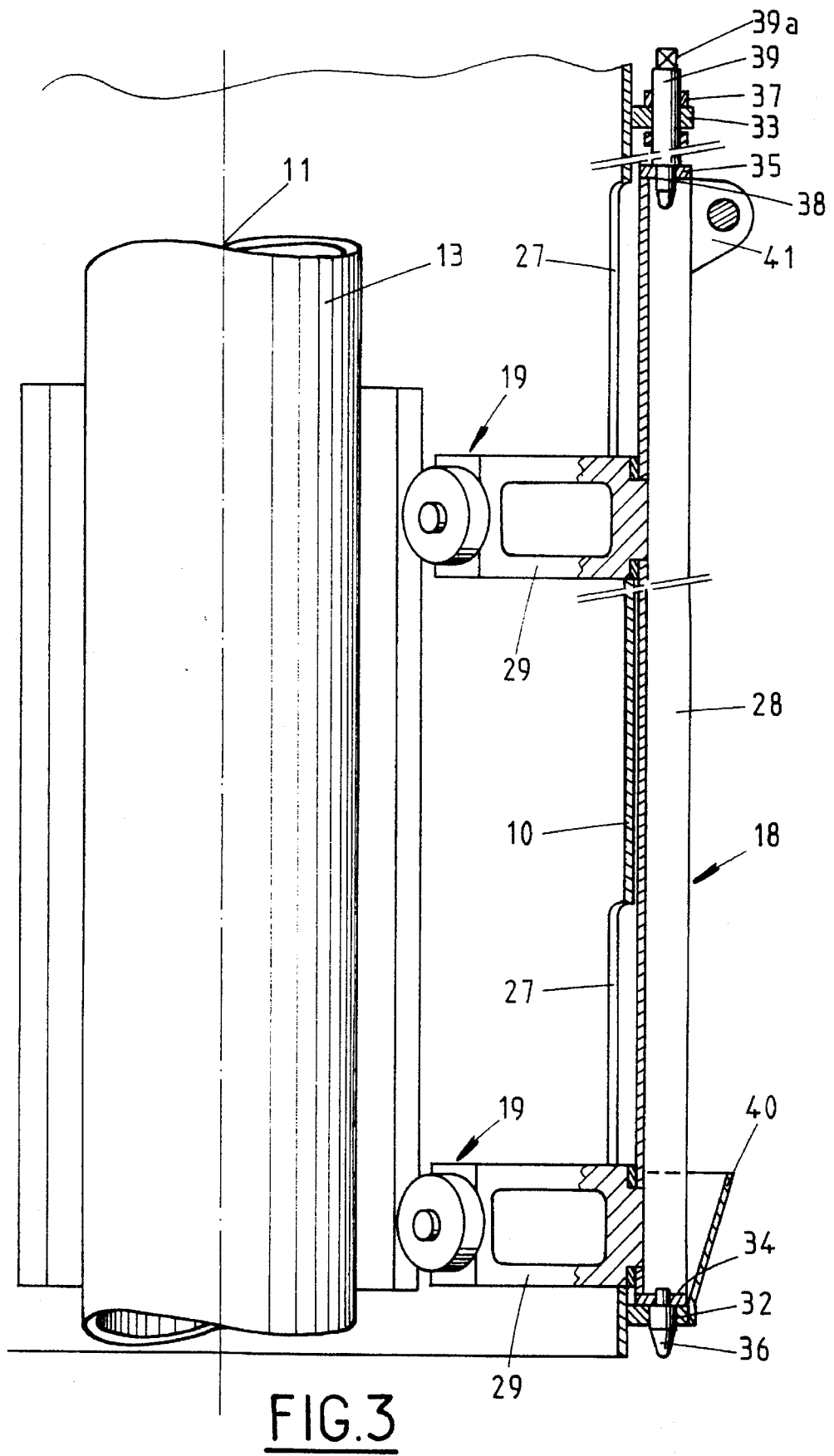
FIG. 3 is a view in partial section through a vertical plane of the external shaft and of the guide elements of a fuelling machine according to the invention.

As shown in FIGS. 2 and 3, the guide elements 18 of the mobile internal mast 13 consist of sets of rollers 19 spaced along the length of a beam 28 and carried by supports 29 which are rigidly and solidly attached to the beam 28.

Each of the sets of rollers 19 includes two rollers having mutually perpendicular axes which are arranged in a plane perpendicular to the axis 11 common to the external shaft 10 and to the mobile internal mast 13.

The straight profiled beam 28, which has a U-shaped cross-section, is slightly shorter than the external shaft 10. Each of the beams 28 is fastened outside the external shaft 10, facing and at a short distance from its external surface, along the direction of the generatrices, i.e. along the axial direction 11 of the external shaft 10.

In its part facing the beams 28, the external shaft 10 includes openings 27 spaced along the axial direction of the shaft 10, each of the openings 27 providing passage for a set of rollers 19 and for the support 29 of these radially directed rollers.

The openings 27 have a height, in the axial direction of the shaft 10, substantially greater than the dimension of the supports 29 of the sets of rollers 19 in this axial direction.

The openings 27 also have a width, in the circumferential direction, substantially greater than the width of the supports 29 and of the sets of rollers 19 in the circumferential direction.

In this way, it is easy to mount the guide elements on the external shaft of the fuelling machine, as will be explained hereinbelow.

As shown in FIG. 2, the fuelling machine includes two guide elements 18 placed opposite each other, so that these two guide elements have the same axial plane 30 of the shaft 10 and of the mast 13 as plane of symmetry.

In particular, the rollers of each of the sets of rollers 19 are arranged symmetrically with respect to the axial plane 30.

The mobile internal mast 13, made in tubular form, includes two guide rails 31 fixed on its exterior surface at 180° from one another.

The rails 31 each include two straight and plane rolling tracks 31a and 31b which are symmetrical with respect to an axial plane of the mast 13, which interact with the rolling surfaces of the rollers of the sets of rollers 19 in order to guide the mobile internal mast 13 during its displacements in the axial direction 11.

The rollers of the sets of rollers 19 and the rolling tracks 31a and 31b of the guide rails 31 of the mobile internal mast 13 are then arranged symmetrically with respect to the axial plane 30.

It is thus possible to guide the mobile mast 13 efficiently by using two guide assemblies arranged at 180° to one another about the axis 11 of the external shaft 10.

Other arrangements are possible, for example the use of three guide elements arranged at 120° about the axis 11 of the shaft 10, or four elements arranged at 90° about the axis 11.

Each of the axially directed guide elements constituted by a beam 18 carries, by means of supports 29, groups of rollers 19 spaced along the axial direction of the external shaft 10. In the case of a machine of the type used in currently employed pressurized water reactors, five sets of two rollers 19 are used, spaced substantially regularly along the axial direction of the external shaft 10.

The external shaft 10 carries, on its external surface, in alignment with each of the axially directed beams 28, a lower support foot 32 and an upper support foot 33.

The foot 32 is fastened on the exterior surface of the external shaft 10, for example by welding, below the lower opening 27 which allows passage of the lower set of rollers 19 and its support 29.

The upper support foot 33 is fastened on the exterior surface of the external shaft 10, for example by welding, above the upper opening 27 which allows passage of the upper set of rollers 19 and its support 29.

The beams 28 of the guide elements 18 each include, at one of their ends, a lower fastening panel 34 and, at their opposite end, an upper fastening panel 35.

The lower fastening panel 34 of each of the beams 28 carries two positioning studs 36 which can be engaged in openings, of corresponding dimensions, passing through a lower support foot 32 of the external shaft 10.

Each of the upper support feet 33 of the external shaft 10 includes two sheaths 37 arranged facing two openings 38 which pass through the upper support panel of the beam 28.

Each of the beams 28 is fastened on the exterior surface of the external shaft 10 by engagement of the positioning studs 36, which are solidly attached to the lower support panel 34 of the beam 28, in two openings of a lower positioning foot 32 of the external shaft 10 and by screwing of two externally threaded fastening studs 39 in the tapped bores of two sheaths 37 which are solidly attached to an upper support foot 33 arranged in axial alignment with the lower support foot 32.

Screwing the fastening studs 39, by means of a tool engaged on a profiled end part 39a of the stud, makes it possible to engage the lower, blocking part of the fastening stud in an opening 38 of the upper fastening plate 35 of the beam 28.

A wall 40, flared upwards in the shape of a funnel, makes it possible to guide the lower part of the beam 28 and engage the positioning studs 36 in the openings of the lower support foot 32 of the external shaft 10.

Each of the beams 28 also includes a handling ring 41 in the vicinity of its upper part.

As shown in FIG. 2, the fuelling machine also includes a video camera fastened to the lower end of a tubular mast 42 which is mounted so that it can move in the axial direction inside the external shaft 10.

The camera fastened to the end of the tubular mast 42 makes it possible to view the operations of gripping and depositing the fuel assemblies 17 in the core of the reactor. The tubular beam 42 for fastening the video camera has independent motorization and guide systems for displacing the video camera during the fuel assembly handling and lifting operations.

On the exterior surface of the external shaft 10, three axially directed rails 43 are also fastened, arranged at 120° with respect to one another about the axis 11 of the external shaft 10, and each carrying a floodlight mounted on a carriage, making it possible to illuminate a part of the operating zone of the fuelling machine.

The images supplied by the camera suspended from the tubular beam 42 are transmitted to a video screen 44 arranged in the control unit 45 of the fuelling machine, carried by the mobile carriage 12 or installed on the operating deck.

At the end of an operation for fuelling or refuelling the core of a nuclear reactor with fuel assemblies, using a fuelling machine according to the invention, the beams 28 of the guide elements 18 are dismounted from the external shaft 10. This dismounting can be carried out very easily, for each of the beams 28, by unscrewing the fastening studs 39 so as to extract the lower engagement parts of these fastening studs from the corresponding openings 38 in the upper fastening panel 35 of the beam 28.

The beam 28 is connected via its handling ring 41 to the lifting hook of a hoist which can be moved on a rail fastened under the carriage of the fuelling machine. The hoist makes it possible to lift the beam 28, so as to disengage the positioning studs 36 from the openings in the lower support foot 32 of the external shaft 10. The beam 28 can then be fully disengaged from the external shaft 10 by moving it in a radial direction, so as to extract the sets of rollers 19 carried by the supports 29 from the openings 27.

The beam 28 is then taken up by the polar crane of the nuclear reactor and removed from the reactor building.

The two beams of the two guide elements of the external shaft which have been removed from the reactor building are successively dismounted before returning the nuclear reactor to operation.

The two beams are stored in a horizontal position outside the reactor building, in a room in which it is possible to check and adjust the alignment of the sets of rollers of each of the beams.

In the event of damage to one or more of the rollers, they can be replaced easily.

The operations of adjusting and repairing the guide elements of the fuelling machine can therefore be carried out under very good conditions for the personnel charged with this task and without having to work inside the building of the reactor. In addition, these operations can be carried out during operation of the nuclear reactor, i.e., without encroaching on the shutdown period of the nuclear reactor during which the fuelling or the refuelling is carried out.

The guide elements are therefore available for an operation of fuelling or refuelling a nuclear reactor by using a fuelling machine according to the invention. In particular, on the site of a nuclear power station including a plurality of reactors equipped with fuelling machines of the same type, it is possible to equip any machine with standard guide elements which have been adjusted and/or repaired after a preceding refuelling operation.

In order to fit the guide elements on a fuelling machine, before a fuelling or refuelling operation, the guide elements are introduced into the reactor building, and they are then fitted in the vicinity of the external shaft of the fuelling machine using the polar crane of the nuclear reactor.

Each of the guide elements is then taken up by the hoist which is located under the carriage of the fuelling machine and can move on a rail in a radial direction.

The beam constituting the support of the guide element is placed in a vertical position in the vicinity of the external surface of the external shaft 10 and is then displaced radially by the hoist so that the sets of rollers 19 and their support 29 are introduced into the corresponding openings 27, in a position which is raised with respect to the lower end of the openings 27.

The beam 28 is then lowered vertically by using the hoist, so that the positioning studs 36 fastened to its lower part which is guided by the funnel-shaped wall 40, engage in the corresponding openings in the support foot 32 of the external shaft 10. The upper part of the beam 28 is then fastened by screwing the fastening studs 39 into the sheaths 37 of the upper support foot 33 of the external shaft 10, so that the lower engagement part of each of the studs 39 engages in the corresponding opening 38 of the upper fastening panel 35 of the beam 28.

Each of the beams constituting the support of each of the guide elements is then mounted in succession.

The fuelling machine is then ready to operate, the mobile internal mast being guided perfectly in the vertical direction by the sets of rollers 19.

If one of the guide elements proves to be defective during fuelling or refuelling of the nuclear reactor, for example due to an incident, it is possible to dismount it without emptying the cavity of the nuclear reactor and to adjust it on the operating deck of the reactor building or replace it with a new guide element which has been adjusted and checked outside the building of the reactor.

The fuelling machine according to the invention can therefore be employed in all cases under very good operating conditions and it can be repaired, after an incident, in a simple and rapid manner.

A different type of means for positioning and fastening the support beam of the guide elements on the external shaft of the fuelling machine than those which have been described may be used.

More than two guide elements in beam form, each including a number of sets of rollers other than five, may also be used.

The fuelling machine according to the invention can be used for carrying out fuelling or refuelling operations of nuclear reactors of widely varied types.

I claim:

1. Fuelling machine for fuel assemblies for the core of a nuclear reactor, inside a reactor vessel having an open upper end in a cavity of the reactor, including horizontal guide means arranged above the reactor vessel, a carriage mounted movably on the guide means, a tubular external shaft, fastened on the carriage with its axis vertical, a cylindrical internal mast mounted in a coaxial arrangement and so that it can move axially inside the external shaft, by virtue of guide elements and means for displacing the internal mast axially of the external shaft, said displacing means being carried by the carriage, wherein the guide elements for the internal mast include at least two straight beams provided with means for fastening in an axial direction on the exterior surface of the external shaft, at least two sets of rollers which can rotate about axes perpendicular to the axial direction of the external shaft and of the internal mast being mounted on each of said beams, spaced apart from one another in the axial direction, the external shaft including a through opening for passage of each of the sets of rollers of each of the beams, inside the external shaft in order to guide the internal mast.

2. Fuelling machine according to claim 1, wherein the rollers of each of the sets of rollers are rotationally mounted on a support which is solidly attached to the beam and extends perpendicularly to the axial direction of the beam and is capable of passing with clearance inside an opening in the external shaft.

3. Fuelling machine according to claim 2, including two guide elements arranged at 180° from one another about the axis of the external shaft, so that the rollers of each of the sets of rollers are arranged symmetrically with respect to an axial plane of the external shaft.

4. Fuelling machine according to claim 3, wherein the mobile internal mast includes guide rails including plane straight tracks interacting with the rolling surfaces of the rollers of the sets of rollers in order to guide axial displacement of the mobile mast.

5. Fuelling machine according to claim 1, wherein the means for removably fastening each of the beams on the external shaft include at least one positioning stud solidly attached to an axial end part of the beam and engaging in an opening in a support foot solidly attached to the external shaft, and at least one threaded fastening stud to be screwed into a tapped sheet externally fastened on the external shaft and including a part for engagement in an opening passing through an end part of the beam, opposite the positioning stud.

6. Fuelling machine according to claim 5, wherein the means for removably fastening each of the beams include two positioning studs and two fastening studs.

7. Fuelling machine according to claim 1, wherein the straight beams of the guide elements each include a handling ring.

8. Fuelling machine according to claim 6 or 7, wherein the external shaft includes, above each of the lower support feet of a beam of a guide element, a guide wall which is flared upwards in the form of a funnel in order to guide the end part of the beam including the positioning stud and for engaging the positioning stud in the opening in the support foot, during positioning of the guide element on the external shaft.

* * * * *